United States Patent
Hu

(10) Patent No.: US 10,520,980 B2
(45) Date of Patent: Dec. 31, 2019

(54) PLUG-IN MODULE AND SMARTBOARD

(71) Applicant: Guangzhou Shirui Electronics Co. Ltd., Guangzhou (CN)

(72) Inventor: Chan Hu, Guangzhou (CN)

(73) Assignee: Guangzhou Shirui Electronics Co. Ltd., Guangzhou (CN)

( * ) Notice: Subject to any disclaimer, the term of this patent is extended or adjusted under 35 U.S.C. 154(b) by 0 days.

(21) Appl. No.: 16/311,263

(22) PCT Filed: Dec. 30, 2016

(86) PCT No.: PCT/CN2016/113672
§ 371 (c)(1),
(2) Date: Dec. 19, 2018

(87) PCT Pub. No.: WO2017/219646
PCT Pub. Date: Dec. 28, 2017

(65) Prior Publication Data
US 2019/0235572 A1    Aug. 1, 2019

(30) Foreign Application Priority Data
Jun. 24, 2016  (CN) .................... 2016 2 0657779 U

(51) Int. Cl.
*H01R 13/627*    (2006.01)
*G06F 1/16*    (2006.01)

(52) U.S. Cl.
CPC .................................. *G06F 1/1632* (2013.01)

(58) Field of Classification Search
None
See application file for complete search history.

(56) References Cited

U.S. PATENT DOCUMENTS 8,113,864 B2   2/2012  Chiang
8,611,099 B2 * 12/2013  Sun ................. H05K 7/1489
                                             361/725

(Continued)

FOREIGN PATENT DOCUMENTS

CN    2674816 Y    1/2005
CN    103926980 A  7/2014

OTHER PUBLICATIONS

European Application No. 16906183.5, Extended European Search Report dated May 23, 2019, 7 page.

(Continued)

*Primary Examiner* — Xanthia C Cunningham
(74) *Attorney, Agent, or Firm* — Zhong Law, LLC

(57) ABSTRACT

A plug-in module (100), has a first side face (110), a first elastic strip (10) and a first pull tab (20) provided at a same end of the first side face; the first elastic strip has an elongated shape, and is provided with at least one first limiting lug (11) on a first surface of the first elastic strip opposite to the first side face, an end of the first elastic strip located in close proximity to the first pull tab is referred to as an opposite end, another end of the first elastic strip is referred to as the distal end, and the distal end and the first side face are affixed together. The opposite end is provided with an elastic strip retraction head (12), and the elastic strip retraction head is provided in correspondence with the first pull tab. Further provided is a smartboard. The plug-in module can be conveniently plugged in and unplugged, simplifying user operations and improving user experience.

12 Claims, 7 Drawing Sheets

(56) References Cited

U.S. PATENT DOCUMENTS

| | | | | |
|---|---|---|---|---|
| 9,210,828 B2* | 12/2015 | Liao | ................. | H05K 5/023 |
| 9,392,724 B2* | 7/2016 | Hafnor | ................. | H05K 7/1457 |
| 2008/0266817 A1* | 10/2008 | Li | ................. | G06F 1/188 |
| | | | | 361/747 |
| 2012/0293975 A1* | 11/2012 | Liang | ................. | G06F 1/188 |
| | | | | 361/807 |
| 2013/0094156 A1* | 4/2013 | Wang | ................. | G06F 1/188 |
| | | | | 361/747 |
| 2015/0208544 A1 | 7/2015 | Liao et al. | | |

OTHER PUBLICATIONS

International Search Report and Written Opinion received in PCT/CN16/113672 dated Apr. 6, 2017, pp. 6.

* cited by examiner

PLUG-IN MODULE AND SMARTBOARD

CROSS-REFERENCE TO RELATED APPLICATIONS

This application is a continuation of International Application No. PCT/CN2016/113672, filed on Dec. 30, 2016, which claims priority to Chinese Patent Application No. 201620657779.9, filed on Jun. 24, 2016, both of which are hereby incorporated by reference in their entireties.

TECHNICAL FIELD

The utility model relates to the field of smartboards, in particular, to a plug-in module and smartboards.

BACKGROUND

With the emergence of intelligent teaching, intelligent office, etc., the smartboard has become widely adopted in different fields and scenarios due to its ease to operate and excellent display effect. At present, the smartboard mostly adopts a plug-in structure. Namely, the smartboard includes a main body portion having a display device and a plug-in module (a host), where the plug-in module is inserted into the main body portion to achieve electrically connection with the main body portion, thereby enabling the transmission of video signal and/or other control signals to the main body portion.

When the plug-in module is being plugged in, the plug-in module is commonly affixed into a slot of the main body portion, and when the plug-in module is being unplugged, two elastic strips affixed onto the plug-in module are simultaneously pressed, so that the elastic strips may hook up with a pull tab to unplug the plug-in module from the slot.

However, this structural design requires simultaneously pressing the elastic strips and hooking up the pull tab to unplug the plug-in module. In one aspect, the pull handle is limited by its size and the distance between the elastic strips is limited by the hardware layout. In another aspect, the current structural design suffers the problems of complicated operation and poor user experience.

SUMMARY

In view of the above-identified problems, the object of the present utility model is to provide a plug-in module and a smartboard that can realize convenient plugging in and unplugging, thus simplifying user operation.

The present utility model provides a plug-in module having a first side face, where the first side face is provided with a first elastic strip and a first pull tab on a same end; the first elastic strip has an elongated shape, and is provided with at least one first limiting lug on a first surface of the first elastic strip, where the end of the first elastic strip located in close proximity to the first pull tab is referred to as the opposite end; the other end of the first elastic strip is referred to as the distal end, where the distal end and the first side face are fixed together; and the opposite end is provided with an elastic strip retraction head, and the elastic strip retraction head is arranged in correspondence with the first pull tab.

Preferably, the first limiting lug includes a first limiting portion and a second limiting portion which are integrally formed, wherein the first limiting portion has a cubiod shape, and is fixed on the first surface; and the second limiting portion is connected to the first limiting portion, and an edge of the second limiting portion has an arc shape.

Preferably, the plug-in module further has a second side face that is in contact with the end of the first side face; the first pull tab includes a first handle and two first connecting arms, an end of the two first connecting arms is arranged on the second side face, the other end of the two first connecting arms is connected to the first handle, and the elastic strip retraction head is arranged between the two first connecting arms.

Preferably, the second side face has a trapezoidal shape, and the plug-in module has a trapezoidal structure.

Preferably, the first handle has an inner side wall facing the elastic strip retraction head, and the inner side wall is provided with anti-slip threads.

Preferably, the elastic strip retraction head has a top surface facing the first pull tab; the top surface has a circular arc surface, and is wrapped with silicone material.

Preferably, a bottom surface of the elastic strip retraction head opposite to the top surface is provided with a groove.

Preferably, the first elastic strip further has a second surface opposite to the first surface, the second surface is provided with a stuck member, and the first side face is provided with a stuck hole, a free end of the stuck member passes through the stuck hole to enter inside of the plug-in module, and the second side face is opened with a locking hole corresponding to the free end of the stuck member.

Preferably, the plug-in module further has a third side face opposite to the first side face, and a second elastic strip and a second pull tab are provided on a same end of the third side face, and the second elastic strip has an elongated shape and is affixed on the third side face, the second pull tab is mounted on the second side face; an end of the second elastic strip that is closer to the second pull tab is provided with at least one second limiting lug, and an edge of the second limiting lug has an arc shape.

Preferably, the plug-in module further includes a grounding device, the plug-in module further has a fourth side face, the grounding device includes at least two grounding elastic strips and a grounding plate connected to the grounding elastic strips, each of the grounding elastic strips is opened with a grounding hole, and the fourth side face is opened with a mounting hole corresponding to the grounding hole, and the grounding hole is embedded in the mounting hole.

Preferably, the grounding hole has a hemispherical shape.

The present utility model further provides a smartboard, comprising a main body portion and the above-mentioned plug-in module, wherein the main body portion is provided with a slot, and the slot is provided with at least one first limiting hole, and the plug-in module is plugged in the slot, to let the first limiting lug be plugged into the first limiting hole.

The plug-in module and the smartboard provided by the embodiment of the present utility model can function as an elastic strip because the first elastic strip has an elongated shape and the distal end thereof is affixed to the first side face. Moreover, since the first elastic strip is arranged relatively close to the first pull tab, such that when the plug-in module is plugged in, the first elastic strip can be operated while the first handle is held, thereby realizing plugging in the plug-in module with a single hand, thus simplifying the operation process and enhancing the user experience.

BRIEF DESCRIPTION OF THE DRAWINGS

In order to more clearly illustrate the technical solutions of the present utility model, the drawings used in the embodiments will be briefly described below. It is obvious that the drawings in the following description are only some embodiments of the present utility model. For those skilled in the art, other drawings can be obtained from these drawings without any creative work.

DETAILED DESCRIPTION OF THE EMBODIMENTS

The technical solutions in the embodiments of the present utility model will be clearly and completely described in conjunction with the accompanying drawings in the embodiments of the present utility model. It is obvious that the described embodiments are only a part of the embodiments of the present utility model, rather than all of the embodiments. All other embodiments obtained by those skilled in the art based on the embodiments of the present utility model without creative efforts are within the protection scope of the present utility model.

Figure 1:
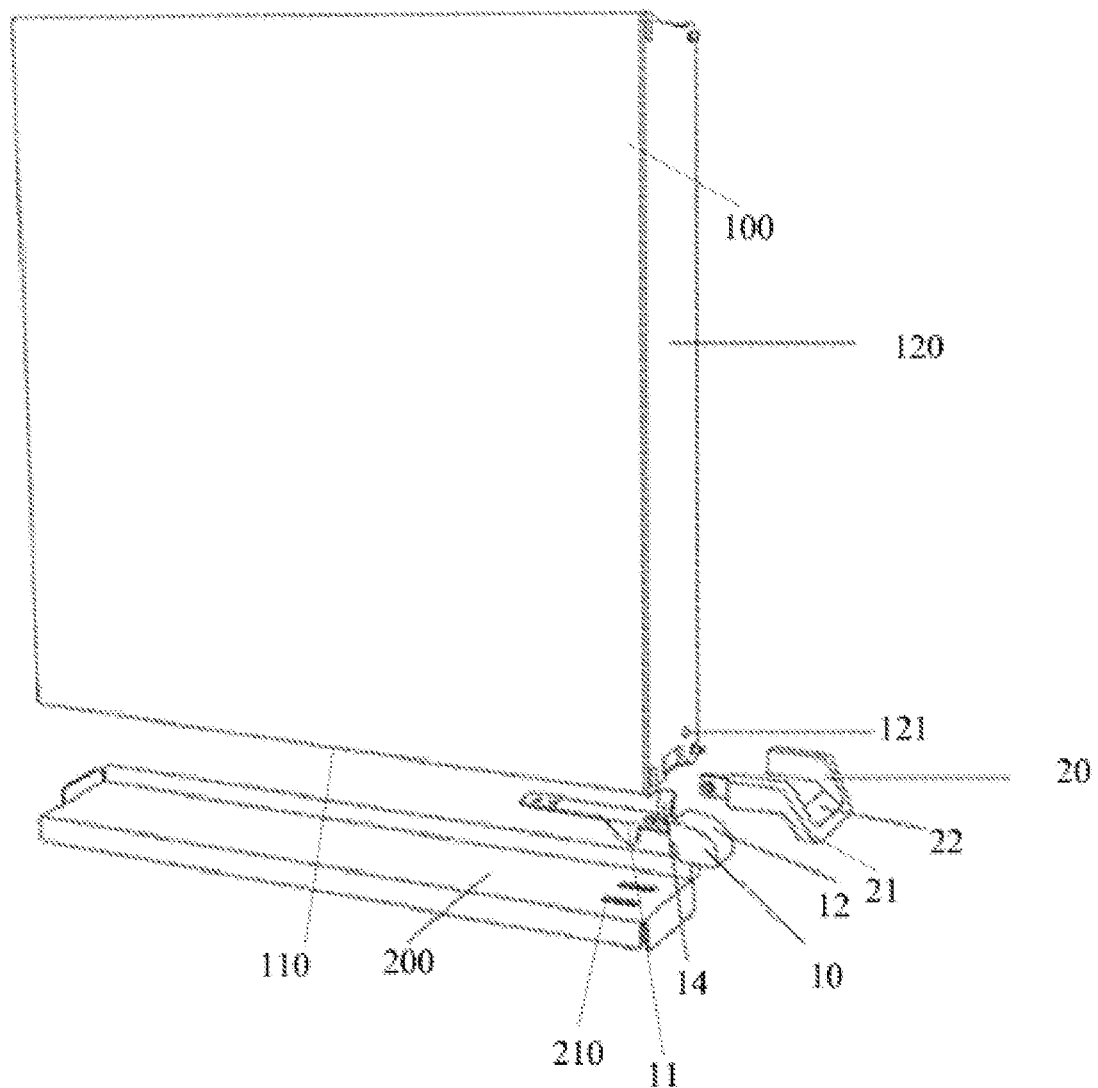
FIG. 1 is an exploded perspective view of a plug-in module and a first rail according to an embodiment of the present utility model.

Referring to FIG. 1, an embodiment of the present utility model provides a plug-in module 100 that can be plugged into a slot of a main body portion of a smartboard or unplugged from the slot of the main body portion of the smartboard. The main body portion may include a display screen, a touch screen, etc., when the plug-in module is plugged into the slot, the main body portion is electrically connected to the plug-in module 100, and can display video signal and recognize the user's operation transmitted from the plug-in module 100, and generate corresponding instructions according to the user's operation.

As shown in FIG. 1, in an embodiment of the present utility model, the plug-in module 100 has a first side face 110, and a first elastic strip 10 and a first pull tab 20 are provided on a same end of the first side face 110. The first elastic strip 10 has an elongated shape, and the first surface of the first elastic strip 10 is facing away from the first side face 110 and is provided with at least one first limiting lug 11. An end of the first elastic strip 10, where the first elastic strip 10 and the first pull tab 20 located in close proximity, is considered to be an opposite end, and the other end of the first elastic strip 10 is considered to be an distal end. The distal end is affixed to the first side face 110, and the opposite end is provided with an elastic strip retraction head 12, where the elastic strip retraction head 12 is arranged in correspondence with the first pull tab 20.

In an embodiment of the present utility model, the first elastic strip 10 may be a strip-shaped piece made of a material with a certain elasticity (for example, a thin metal), and the distal end thereof is affixed on the first side face 110. And except for the distal end, the remaining portion of the first elastic strip 10 does not attach to the first side face 100 (i.e., a gap is formed between the remaining portion of the first elastic strip and the first side face 110), and thus when the elastic strip retraction head 12 is subjected to the external pulling force, the external pulling force may cause an bending deformation of the first elastic strip 10.

In an embodiment of the present utility model, a first rail 200 may be provided in the slot of the main body portion, wherein the first rail 200 is provided with a first limiting hole 210 corresponding to the first limiting lug 11. When the plug-in module 100 is plugged into the slot, the first side face 110 is in close contact with the first rail 200, and the first limiting lug 11 is plugged into the first limiting hole and is locked in the first limiting hole 210, thereby achieving an engaged connection between the plug-in module 110 and the first rail 200. Preferably, the number of the first limiting lugs 11 is two and symmetrically distributed on both sides of the first surface.

In an embodiment of the present utility model, the plug-in module 100 further has a second side face 120 that is in contact with the end of the first side face 110. The first pull tab 20 includes a first handle 22 and two first connecting arms 21, wherein an end of the first connecting arm 21 is arranged on the second side face 120, the other end of the two first connecting arms 21 is connected to the first handle 22, and the elastic strip retraction head 12 is located below the first pull tab 20. More specifically, the elastic strip retraction head 12 is located between the gaps formed by the two first connecting arms 21 and extends below the first handle 22, so that when the elastic strip retraction head 12 is pulled upward, it can pass through the gap between the two first connecting arms 21 and hook up with the first handle 22.

In an embodiment of the present utility model, in order to enable the elastic strip retraction head 12 to hook up with the first handle 22, the distance between the end of the elastic strip retraction head 12 and the second side face 120 should be slightly larger than the distance between the first handle 22 and the second side face 120, and a top surface of the elastic strip retraction head 12 facing the first pull tab 20 may be arranged with a circular arc surface, so that when the elastic strip retraction head 12 moves upward, the top surface thereof is in a smooth contact with the first handle 22. In addition, in order to protect the elastic strip retraction head 12 and the first handle 22, the top surface of the elastic strip retraction head 12 is covered with silicone material to prevent scratches on the surface due to high friction.

In the embodiment of the present utility model, when the plug-in module 100 needs to be unplugged from the slot of the main body portion, when the elastic strip retraction head 12 is lifted in a direction away from the first side face 110, and the elastic strip retraction head 12 is hooked onto the first handle 22, the first elastic strip 10 is elastically bending deformed, and the first limiting lug 11 is moved in the lifting direction, and is relieved from the state of being stuck by the limiting hole 210, such that the sliding of the plugging module 110 on the first rail 200 can be achieved by pulling the first handle 22, resulting in that the plug-in module 100 is unplugged from the slot. When the plug-in module 100 needs to be plugged into the slot, the plug-in module 100 can be directly plugged into the slot. Since the first elastic strip 10 itself has elasticity, the first limiting lug 11 can be automatically inserted into the first limiting hole 210 on the first rail 200.

In summary, the plug-in module 100 provided by the embodiment of the present utility model can function as an elastic strip because the first elastic strip 10 has an elongated shape and its distal end is affixed to the first side face 110. The first elastic strip 10 is arranged relatively close to the first pull tab 20, so that when the plug-in module 100 is pulled, the elastic strip retraction head 12 of the first elastic strip 10 can be operated upon while first handle 22 is held, thereby achieving the plugging of the plug-in module 100 with one hand, thus simplifying the operation process and improving the user experience.

In order to facilitate the understanding of the present utility model, some preferred embodiments of the present utility model will be further described below.

First Preferred Embodiment

Figure 2:
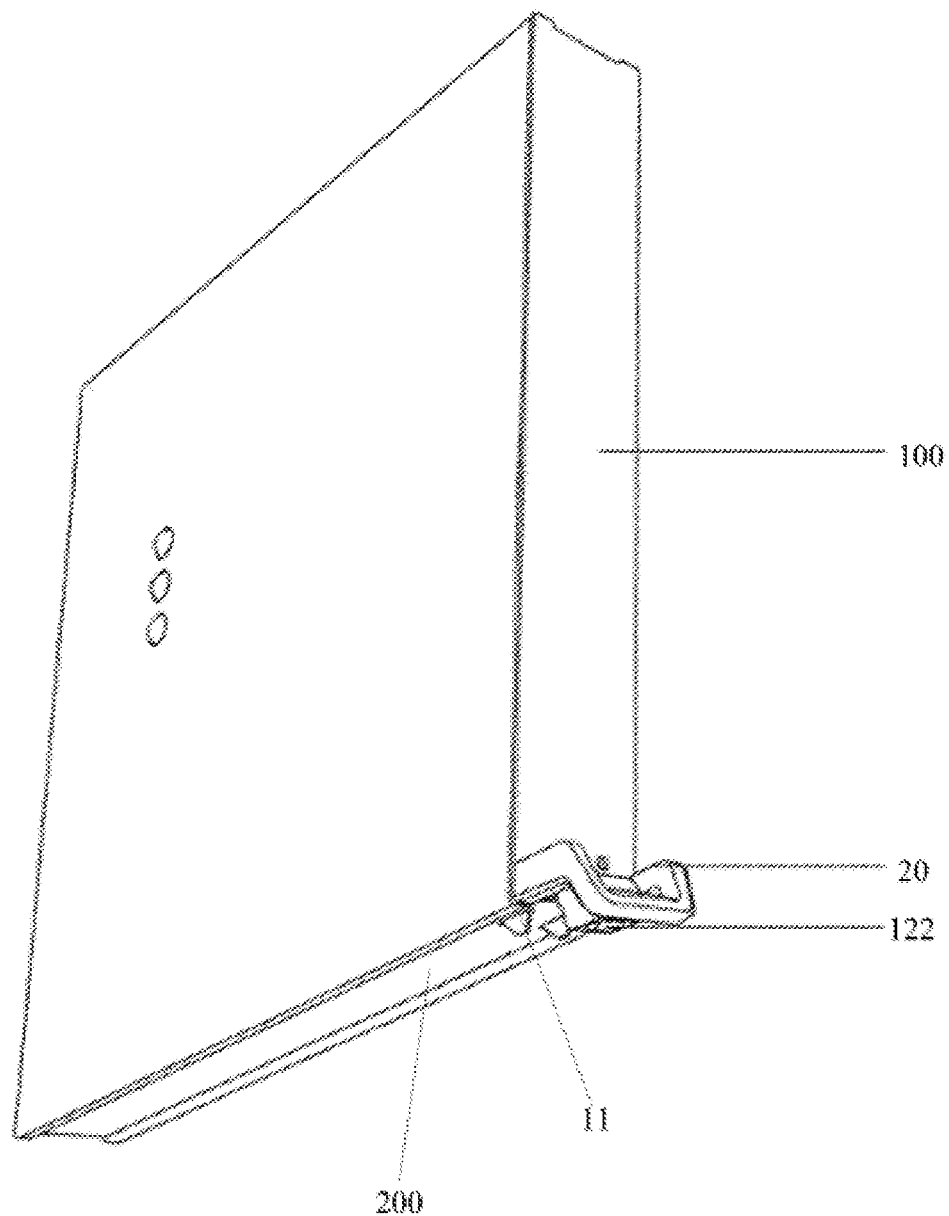
FIG. 2 is a schematic view of a plug-in module assembled to the first rail according to an embodiment of the present utility model.
Figure 3:
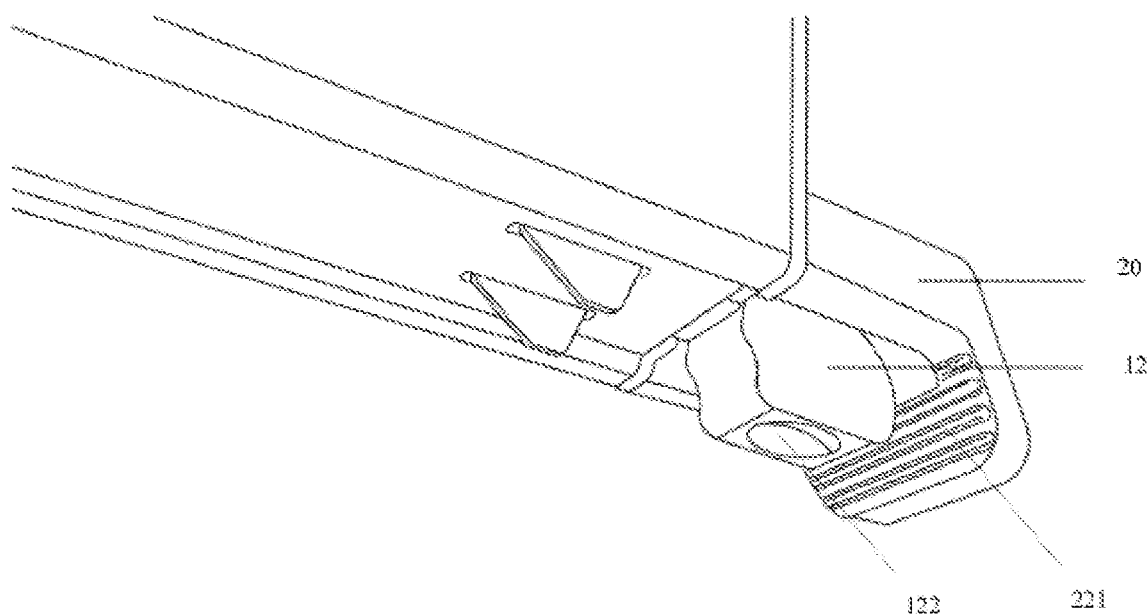
FIG. 3 is a schematic structural view of a bottom face of a first elastic strip and an inner side wall of a first pull tab according to an embodiment of the present utility model.

Preferably, as shown in FIG. 2 and FIG. 3, an bottom surface of the elastic strip retraction head 12 opposite to the top surface is provided with a groove 122 through which an user's finger can conveniently lift up the elastic strip retraction head 12, which, on one hand, can control the position of the lifting, and on the other hand, can avoid the phenomenon of hand slipping during lifting.

Second Preferred Embodiment

Preferably, as shown in FIG. 3, the first handle 22 has an inner side wall facing the elastic strip retraction head, and the inner side wall is provided with anti-slip threads 221. The anti-slip threads 221 can increase the friction of pulling the first handle 22 in order to prevent slipping while pulling.

Third Preferred Embodiment

Figure 4:
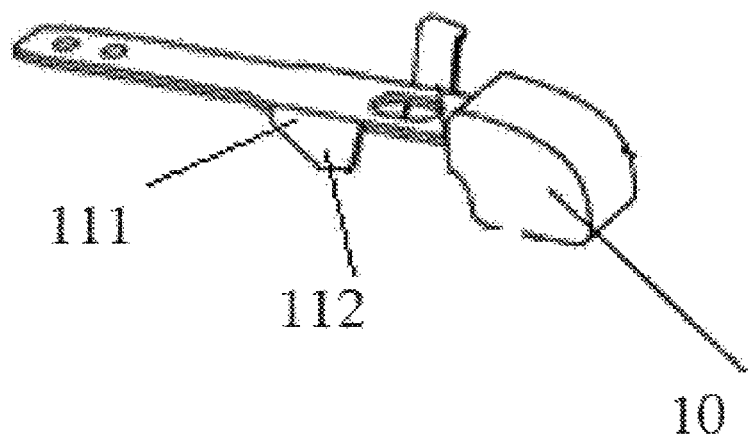
FIG. 4 is a schematic structural view of a first elastic strip according to an embodiment of the present utility model.

Preferably, referring to FIG. 4, the first limiting lug 11 includes a first limiting portion 111 and a second limiting portion 112, wherein the first limiting portion 111 has a substantially cubiod shape, and the length and thickness thereof is slightly smaller than the length and width of the first limiting hole 210 respectively, such that when the first limiting lug 11 is plugged into the first limiting hole 210, the first limiting portion 111 will be engaged with the first limiting hole 210. Therefore, the plug-in module 100 is affixed onto the first rail 200 and cannot slide relative to the first rail 200.

In this preferred embodiment, an edge of the second limiting portion 112 has an arc shape, and since the edge of the second limiting portion 112 has an arc shape, only the first limiting portion 111 needs to be disengaged from the first limiting hole 210, to achieve the sliding of the plug-in module 100 on the first rail 200. Specifically, when the second limiting portion 112 is in contact with the first limiting hole 210, if the second limiting portion 112 is subjected to a horizontal force, the force can be decomposed into a force in a horizontal direction and a force in a vertical direction, wherein the force in the vertical direction causes the elastic bending deformation of the first elastic strip 10, so that the second limiting portion 112 is automatically disengaged from the first limiting hole 210.

In this preferred embodiment, the pulling of the plug-in module 100 can be achieved only by the first limiting portion 111 being disengaged from the first limiting hole 210, thereby saving required force of pulling the elastic strip retraction head 12 upward, which further facilitates user's utilization and operation.

Fourth Preferred Embodiment

Figure 5:
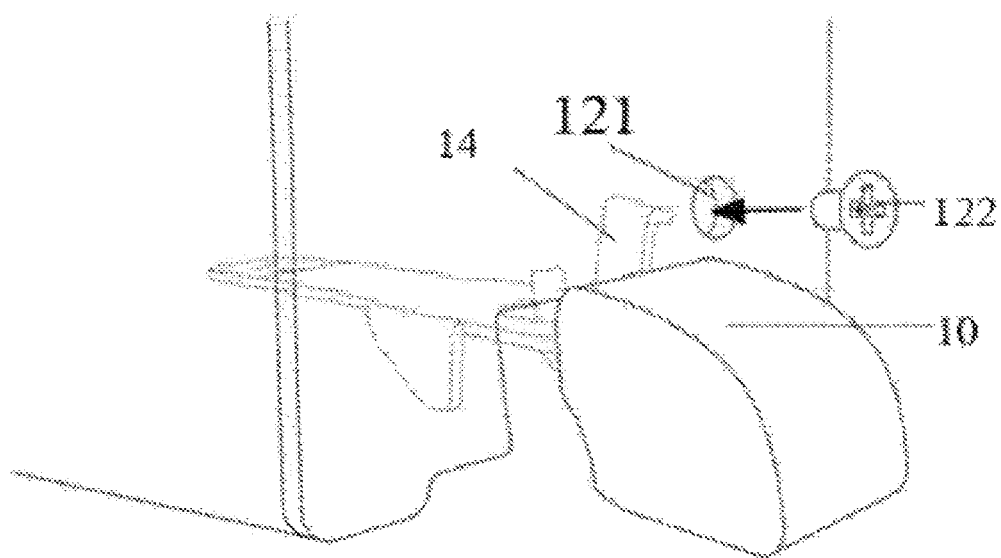
FIG. 5 is a schematic view of a first elastic strip locked by a lock hole and a screw.
Figure 6:
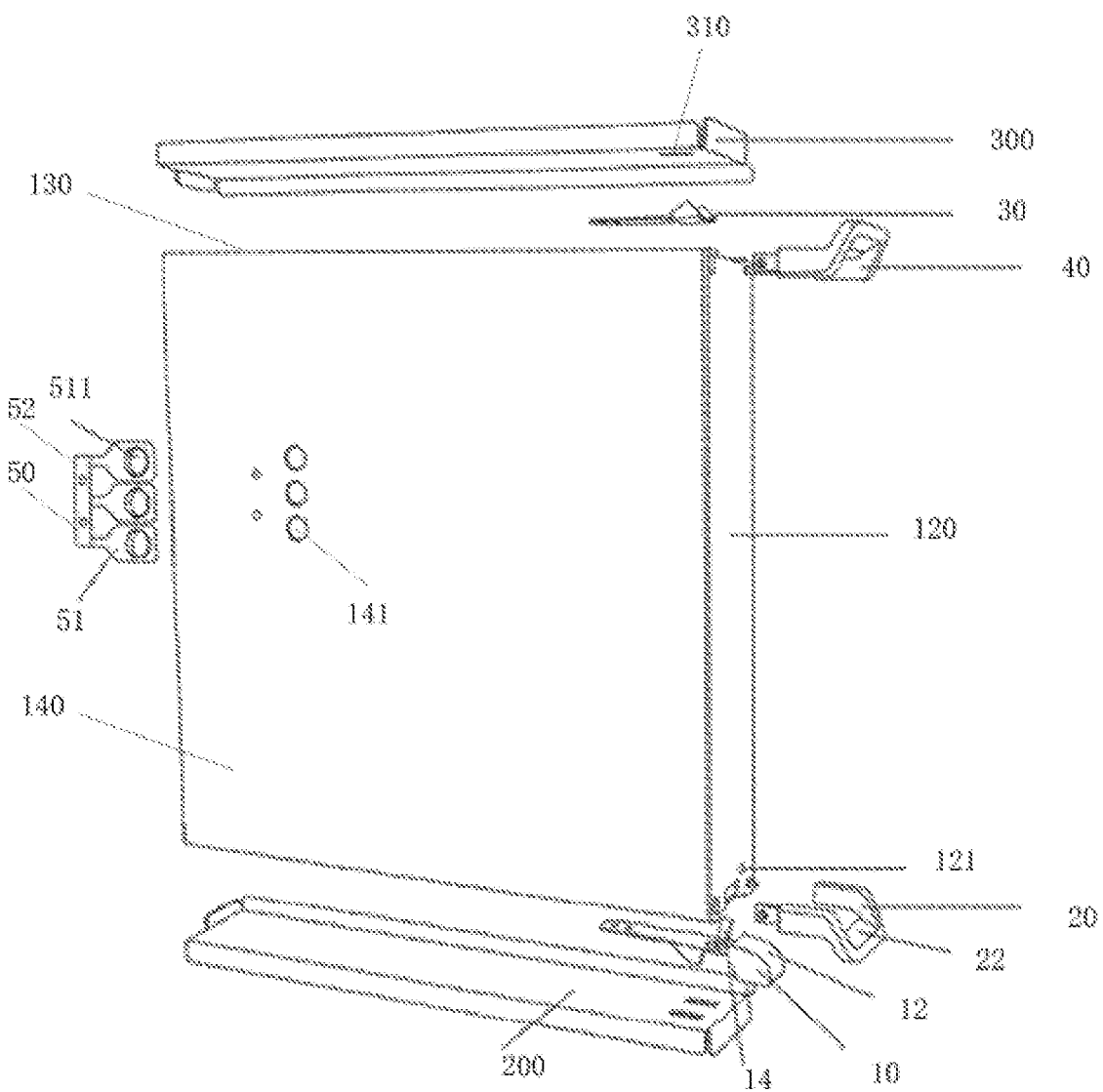
FIG. 6 is an exploded perspective view of a plug-in module and a first rail as well as a second rail according to an embodiment of the present utility model.

Preferably, referring to FIG. 5, in an embodiment of the present utility model, the first elastic strip 10 further has a second surface opposite to the first surface, and the second surface is provided with a stuck member 14. The first side face 110 is provided with a stuck hole (not shown). A free end of the stuck member 14 passes through the stuck hole and enters inside of the plug-in module 100. The second side face 120 is provided with a lock hole 121 corresponding to the free end of the stuck member. Specifically, the distance between the locking hole 121 and the first side face 110 is slightly larger than the distance between the free end of the stuck member 14 and the first side face 110.

The function is that, the locking hole 121 can receive insertion of a screw 122, and when the screw 122 is inserted, the screw 122 is pressed against the free end of the stuck member 14. As such, the first elastic strip 10 is tightly fixed and can't move upward. The first elastic strip 10 can be operated only when the screw 122 is unscrewed, thus preventing the plug-in module 100 from being arbitrarily plugged or removed.

It should be noted that, in the embodiment of the present utility model, the stuck member 14 is substantially in the shape of F, so that the screw 122 can be easily pressed against the free end of the stuck member 14.

Fifth Preferred Embodiment

When a volume of the plug-in module 100 is relatively large, pulling by only one pull tab may be difficult, and it is difficult to maintain the balance of the host. Moreover, for some specific scenarios, it is sometimes necessary to fix both sides of the plug-in module 100 to ensure stability.

Specifically, please refer to FIG. 6 to FIG. 9, in this preferred embodiment, the plug-in module 100 further has a third side face 130 opposite to the first side face 110, where a second elastic strip 30 and a second pull tab 40 are further provided at the same end portion of the third side face 130. The second elastic strip 30 has an elongated shape and is fixed on the third side face 130, and the second pull tab 40 is mounted on the second side face 120. An end of the second elastic strip 30, where the second elastic strip 30 and the second pull tab 40 are located in close proximity, is provided with at least one second limiting lug 32, and an edge of the second limiting lug 32 has an arc shape.

The slot further includes a second rail 300 corresponding to the first rail 200. The third side face 130 of the plug-in module 100 is arranged on the second rail 300, and the second limit lug 32 is inserted into the second limiting hole 310 on the second rail 300, thereby achieving simultaneous fixation on both sides.

Figure 7:
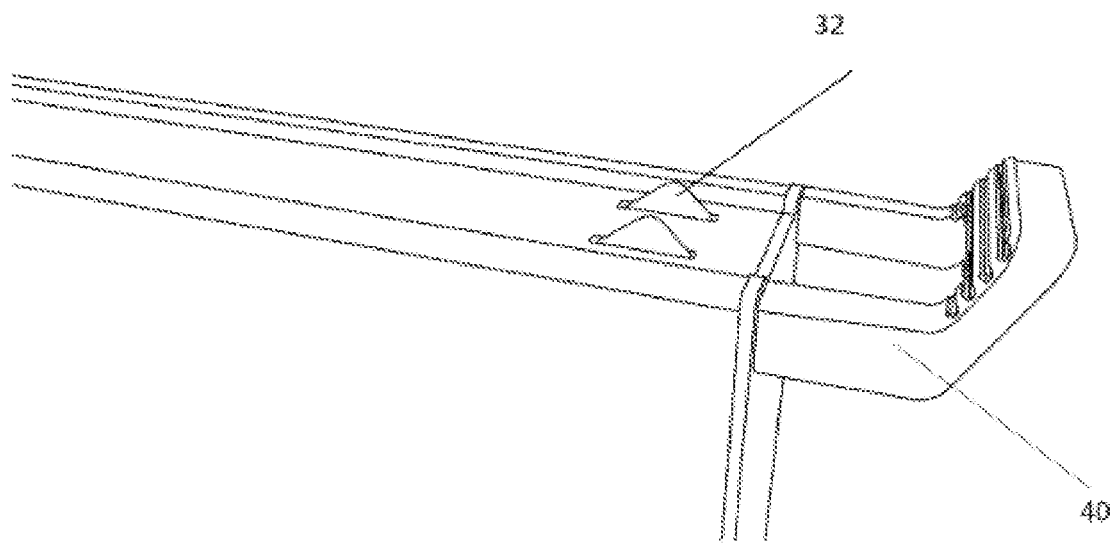
FIG. 7 is a schematic diagram of a plug-in module fixed to a second rail according to an embodiment of the present utility model.
Figure 8:
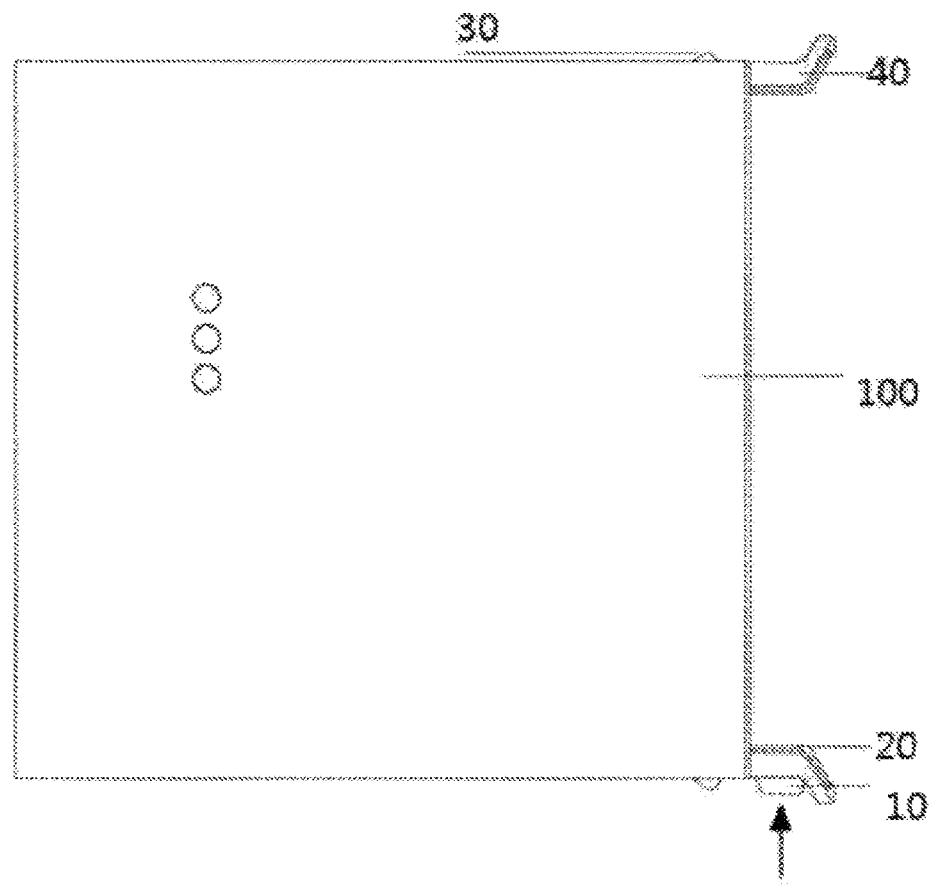
FIG. 8 is a schematic diagram of an operation of a plug-in module according to an embodiment of the present utility model.
Figure 9:
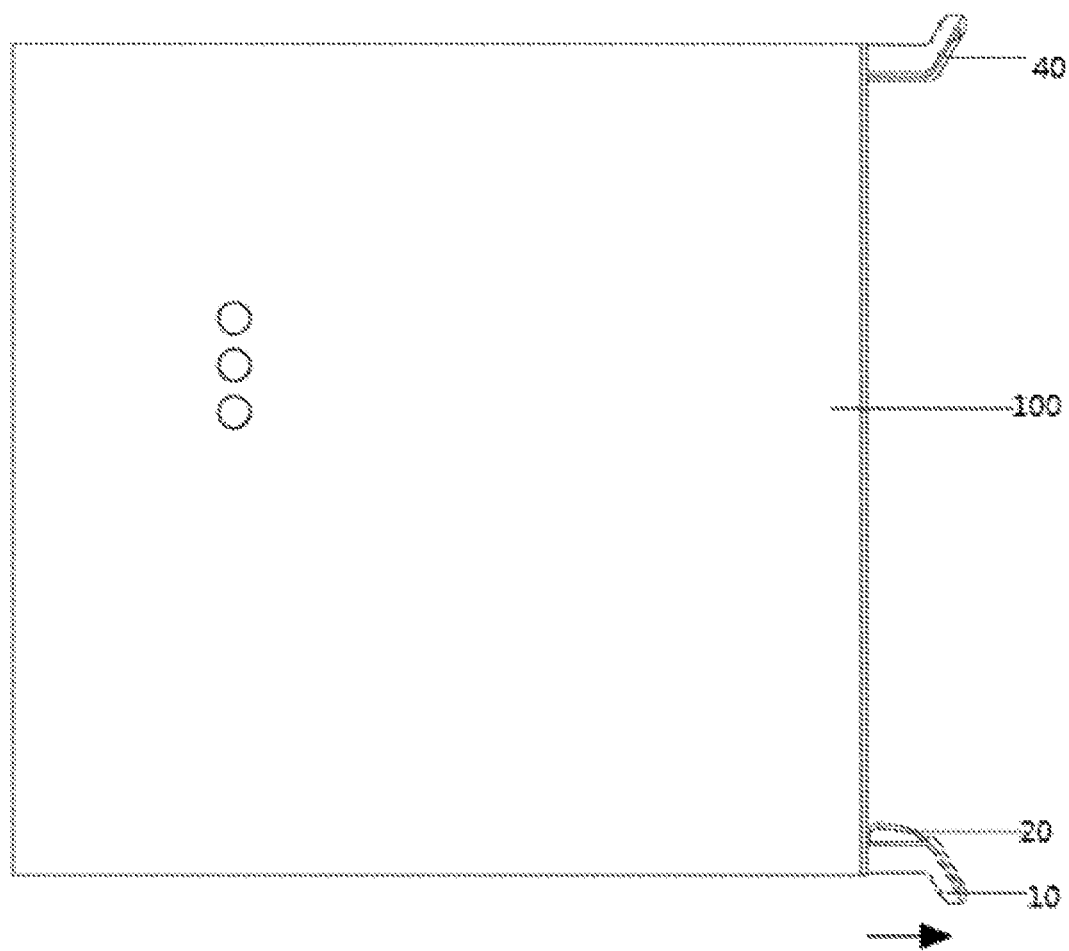
FIG. 9 is a schematic diagram of an operation of a plug-in module according to an embodiment of the present utility model.

As shown in FIG. 7, in this preferred embodiment, the edge of the second limiting lug 32 has an arc shape, so when the second pull tab 40 is pulled, the force received at the edge of the second limiting lug 32 may be decomposed into a force in a horizontal direction and a force in a vertical direction, where the force in the vertical direction causes the second elastic strip 30 to be elastically deformed and in an upwardly bending shape, thereby causing the second limiting lug 32 automatically disengaged from the second limiting hole 310.

It should be noted that, in order to facilitate the pulling, the second pull tab 42 is also provided with anti-slip threads, thereby increasing the friction during pulling and avoiding the occurrences of hand slipping during pulling.

In this preferred embodiment, by adding the second elastic strip 30 and the second pull tab 40 to assist the pulling of the plug-in module 100, the entire pulling process can be made smoother.

Sixth Preferred Embodiment

For safety reasons, in general, the plug-in module 100 also needs to be grounded. Therefore, in this preferred embodiment, the plug-in module 100 further includes a grounding device 50. The plug-in module 100 further has a fourth side face 140. The grounding device 50 includes at least two grounding elastic strips 51, and a grounding plate 52 connecting the grounding elastic strips 51, where each of the grounding elastic strips is opened with a grounding hole 511. The fourth side face 140 is provided with a mounting hole 141 corresponding to the grounding hole. The grounding hole 511 is embedded in the mounting hole 141.

The grounding hole 511 of the grounding elastic strip 51 has a substantially hemispherical structure, which can ensure sufficient contact with the plug-in module 100. Since the number of the grounding elastic strips 51 is at least two, security problems caused by bad grounding can be prevented from multiple aspects.

Seventh Preferred Embodiment

Preferably, the first side face 110 has an trapezoidal shape, that is, the plug-in module 100 has a trapezoidal structure as a whole (correspondingly, the section of the slot of the main body portion is also trapezoidal), ensuring that the plug-in module 100 can properly inserted into the slot to prevent the insertion direction from being reversed and damage to a contact end (fixed to the side face opposite to the first side face) causing by the reverse insertion direction, which may cause the plug-in module 100 to fail to properly perform electrical connection with the body portion.

An embodiment of the present utility model further provides a smartboard, the smartboard includes a main body portion and the plug-in module 100, wherein the plug-in module 100 can be plugged into a slot of the main body portion of the smartboard or unplugged from the slot of the main body portion, and when the plug-in module 100 is plugged into the slot, the plug-in module 100 is electrically connected to the main body portion.

According to the smartboard provided by the embodiment of the present utility model, the first elastic strip 10 can perform the function of an elastic strip because the first elastic strip 10 has an elongated shape and its distal end is fixed to the first side face 110. The first elastic strip 10 is arranged relatively close to the first pull tab 20, so that when the plug-in module 100 is pulled, the elastic strip retraction head 12 of the first elastic strip 10 can be operated while the first handle 22 is held, thereby achieving pulling of the plug-in module 100 by one hand, simplifying the operation process and improving the user experience.

The above description is only a specific embodiment of the present utility model, but the scope of protection of the present utility model is not limited thereto, and any changes or substitutions within the technical scope disclosed by the present utility model, easily thought of by person skilled in the art, should be covered by the scope of the present utility model. Therefore, the scope of protection of the present utility model should be determined by the scope of the claims.

What is claimed is:

1. A plug-in module having a first side face, comprising:
   a first elastic strip and a first pull tab provided on a same end of the first side face;
   the first elastic strip has an elongated shape, and is provided with at least one first limiting lug on a first surface of the first elastic strip, wherein the first surface is opposite to the first side face, wherein a first end of the first elastic strip located in close proximity to the first pull tab is referred to as an opposite end, and a second end of the first elastic strip is referred to as a distal end, and wherein the distal end is affixed to the first side face, and wherein the opposite end is provided with an elastic strip retraction head, and the elastic strip retraction head is arranged in a position corresponding to the first pull tab.

2. The plug-in module according to claim 1, wherein the first limiting lug comprises a first limiting portion and a second limiting portion which are integrally formed, wherein the first limiting portion has a cubiod shape, and is fixed on the first surface, and the second limiting portion is connected to the first limiting portion, and wherein an edge of the second limiting portion is arc-shaped.

3. The plug-in module according to claim 1, wherein the plug-in module further has a second side face that is in contact with the end of the first side face, wherein the first pull tab comprises a first handle and two first connecting arms, a respective first end of the two first connecting arms is arranged on the second side face, a respective second end of the two first connecting arms is connected to the first handle, and the elastic strip retraction head is arranged between the two first connecting arms.

4. The plug-in module according to claim 3, wherein the second side face has a trapezoidal shape, and the plug-in module has a trapezoidal structure.

5. The plug-in module according to claim 3, wherein the first pull tab has an inner side wall facing the elastic strip retraction head, and the inner side wall is provided with an anti-slip thread.

6. The plug-in module according to claim 3, wherein the elastic strip retraction head has a top surface facing the first pull tab, the top surface has a circular arc surface, and the top surface is covered with silicone material.

7. The plug-in module according to claim 6, wherein a bottom surface of the elastic strip retraction head opposite to the top surface is provided with a groove.

8. The plug-in module according to claim 3, wherein the first elastic strip further has a second surface opposite to the first surface, and the second surface is provided with a stuck member, and the first side face defines a stuck hole, a free end of the stuck member passes through the stuck hole and enters inside of the plug-in module, and the second side face is provided with a lock hole corresponding to the free end of the stuck member.

9. The plug-in module according to claim 3, wherein the plug-in module further has a third side face opposite to the first side face, and a second elastic strip and a second pull tab are provided on a same end of the third side face, the second elastic strip has an elongated shape and is affixed on the third side face, the second pull tab is mounted on the second side face, and wherein an end of the second elastic strip that is closer to the second pull tab is provided with at least one second limiting lug, and wherein an edge of the second limiting lug has an arc shape.

10. The plug-in module according to claim 1, wherein the plug-in module further comprises a grounding device, the plug-in module further has a fourth side face, the grounding device comprises at least two grounding elastic strips and a grounding plate connected to the grounding elastic strips, each of the grounding elastic strips is provided with a grounding hole, the fourth side face is opened with a mounting hole corresponding to the grounding hole, and the grounding hole is embedded in the mounting hole.

11. The plug-in module according to claim 10, wherein the grounding hole has a hemispherical shape.

12. A smartboard comprising:
   a main body portion comprising a slot, wherein the slot is provided with at least one first limiting hole, wherein the smartboard further comprising the plug-in module according to claim 1, and wherein the plug-in module is plugged into the slot, to allow the first limiting lug be plugged into the first limiting hole.

\* \* \* \* \*